United States Patent
Chu et al.

(10) Patent No.: US 10,439,660 B2
(45) Date of Patent: Oct. 8, 2019

(54) METHOD AND DEVICE FOR ADJUSTING FREQUENCIES OF INTERCOM APPARATUSES

(71) Applicant: Beijing Xiaomi Mobile Software Co., Ltd., Haidian District, Beijing (CN)

(72) Inventors: Yueyue Chu, Beijing (CN); Yan Xie, Beijing (CN); Weizhao Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/702,731

(22) Filed: Sep. 12, 2017

(65) Prior Publication Data

US 2018/0138933 A1   May 17, 2018

(30) Foreign Application Priority Data

Nov. 14, 2016  (CN) .......................... 2016 1 1019370

(51) Int. Cl.
*H04B 1/04* (2006.01)
*H04M 1/725* (2006.01)
(Continued)

(52) U.S. Cl.
CPC .......... *H04B 1/0475* (2013.01); *G08C 17/02* (2013.01); *H04M 1/7253* (2013.01);
(Continued)

(58) Field of Classification Search
None
See application file for complete search history.

(56) References Cited

U.S. PATENT DOCUMENTS

2003/0207694 A1* 11/2003 Legare .............. H04M 1/72513
455/511
2009/0023417 A1* 1/2009 Davis ................. H04M 1/6066
455/403
(Continued)

FOREIGN PATENT DOCUMENTS

CN         102869019 A         1/2013

OTHER PUBLICATIONS

Extended European Search Report for EP application 17189014.8, dated Mar. 15, 2018.
(Continued)

*Primary Examiner* — David Bilodeau
(74) *Attorney, Agent, or Firm* — Jun He Law Offices P.C.; James J. Zhu (57) ABSTRACT

A method and a device for adjusting frequencies of intercom apparatuses are provided. The method includes: detecting, at a current operating frequency of a first intercom apparatus, an unknown speech signal sent from an intercom apparatus other than the first intercom apparatus, the first intercom apparatus communicating with at least one second intercom apparatus associated with at least one second terminal; determining a target operating frequency; and sending a first adjusting instruction instructing the first intercom apparatus to adjust the current operating frequency to the target operating frequency; and sending a frequency changing message to the at least one second terminal for controlling the at least one second intercom apparatus to adjust the current operating frequency to the target operating frequency.

11 Claims, 6 Drawing Sheets

(51) Int. Cl.
*H04Q 5/24* (2006.01)
*G08C 17/02* (2006.01)

(52) U.S. Cl.
CPC ... *H04M 1/72511* (2013.01); *H04M 1/72513* (2013.01); *H04Q 5/24* (2013.01)

(56) References Cited

U.S. PATENT DOCUMENTS

| | | | | |
|---|---|---|---|---|
| 2009/0023422 A1* | 1/2009 | MacInnis | ............ | G06F 16/2379 |
| | | | | 455/411 |
| 2010/0197257 A1* | 8/2010 | Rajkotia | ............ | H04B 1/1036 |
| | | | | 455/188.1 |
| 2011/0165862 A1* | 7/2011 | Yu | ............ | H04M 1/7253 |
| | | | | 455/411 |
| 2012/0274859 A1* | 11/2012 | Knutson | ............ | H04L 12/66 |
| | | | | 348/723 |
| 2014/0221039 A1 | 8/2014 | Liao et al. | | |
| 2015/0038184 A1 | 2/2015 | Macafee et al. | | |
| 2015/0200709 A1* | 7/2015 | Negus | ............ | H04W 24/02 |
| | | | | 375/146 |

OTHER PUBLICATIONS

The First Office Action in Chinese patent application No. 201611019370.5, dated Jun. 5, 2018.

\* cited by examiner

METHOD AND DEVICE FOR ADJUSTING FREQUENCIES OF INTERCOM APPARATUSES

CROSS-REFERENCE TO RELATED APPLICATIONS

This application is based upon and claims priority to Chinese Patent Application Serial No. 201611019370.5, filed with the State Intellectual Property Office of P. R. China on Nov. 14, 2016, the entire contents of which are incorporated herein by reference.

TECHNICAL FIELD

The present disclosure generally relates to a wireless communication technology field, and more particularly, to a method and a device for adjusting frequencies of intercom apparatuses.

BACKGROUND

With the development of the wireless communication technology, intercom apparatuses have gradually become a common communication tool in today's society due to advantages such as low call costs, not limited by the network, and allowing a plurality of people to have a dialogue at same time. When a plurality of users use intercom apparatuses, they can adjust current operating frequencies of their intercom apparatuses to a same operating frequency for sending and receiving speech signals, realizing communication among many people.

However, when another user having an intercom apparatus also adjust his intercom apparatus to the operating frequency, a speech signal sent from this user can be received by intercom apparatuses of the plurality of users, which is called an unknown speech signal for ease of description. The unknown speech signal may interfere with the plurality of users. At this time, the plurality of users may need to manually adjust current operating frequencies of their intercom apparatuses to another operating frequency, thus avoiding interference of the unknown speech signal.

SUMMARY

According to a first aspect of embodiments of the present disclosure, there is provided a method for adjusting frequencies of intercom apparatuses, the method applied to a first terminal and including: detecting, at a current operating frequency of a first intercom apparatus, an unknown speech signal sent from an intercom apparatus other than the first intercom apparatus, the first intercom apparatus communicating with at least one second intercom apparatus associated with at least one second terminal; determining a target operating frequency; and sending a first adjusting instruction instructing the first intercom apparatus to adjust the current operating frequency to the target operating frequency; and sending a frequency changing message to the at least one second terminal for controlling the at least one second intercom apparatus to adjust the current operating frequency to the target operating frequency.

According to a second aspect of embodiments of the present disclosure, there is provided a method for adjusting frequencies of intercom apparatuses, applied to a first intercom apparatus and including: receiving a first adjusting instruction sent from a first terminal associated with the first intercom apparatus, in which the first adjusting instruction carries a target operating frequency, and the target operating frequency is determined when an unknown speech signal is detected at a current operating frequency of the first intercom apparatus; and adjusting the current operating frequency of the first intercom apparatus to the target operating frequency according to the first adjusting instruction.

According to a third aspect of embodiments of the present disclosure, there is provided a device for adjusting frequencies of intercom apparatuses, including a processor and a memory configured to store instructions executable by the first processor. The processor is configured to: detect, at a current operating frequency of a first intercom apparatus, an unknown speech signal sent from an intercom apparatus other than the first intercom apparatus, the first intercom apparatus communicating with at least one second intercom apparatus associated with at least one second terminal; determine a target operating frequency; and send a first adjusting instruction instructing the first intercom apparatus to adjust the current operating frequency to the target operating frequency; and send a frequency changing message to the at least one second terminal for controlling the at least one second intercom apparatus to adjust the current operating frequency to the target operating frequency.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

The present disclosure will be descripted in detail with reference to drawings and specific embodiments, so as to make objectives, technical solutions and advantages of the present disclosure clearer.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Typically, when an intercom apparatus of a user detects interference of an unknown speech signal, the user has to manually adjust a current operating frequency of the intercom apparatus carried by him to another operating frequency, avoiding the interference of the unknown speech signal. When the user manually adjusts the frequency of the intercom apparatus, operating process is complex, resulting in a low efficiency for adjusting the frequency of the intercom apparatus. In addition, when there is interference of the unknown speech signal at the current operating frequency, users may not communicate and negotiate with each other through speech in the process of adjusting the operating frequency for maintaining confidentiality, which brings great trouble to the users.

In embodiments of the present disclosure, a first terminal is associated with the first intercom apparatus, at least one second terminal is associated with at least one second intercom apparatus, and the first intercom apparatus communicates with the at least one second intercom apparatus. When the first terminal detects that there is an unknown speech signal at the current operating frequency of the first intercom apparatus, the first terminal determines a target operating frequency, automatically controls the first intercom apparatus to adjust the current operating frequency to the target operating frequency, and sends a frequency changing message to the at least one second terminal, such that the at least one second terminal controls the at least one second intercom apparatus to adjust the current operating frequency to the target operating frequency, thus realizing automatically adjusting the frequencies of the intercom apparatuses without user's operation, and improving efficiency for adjusting the frequencies of the intercom apparatuses.

The first terminal may be associated with the first intercom apparatus via Bluetooth, Wireless Fidelity (Wi-Fi) or the like, and the at least one second terminal may also be associated with the at least one second intercom apparatus via Bluetooth, Wi-Fi or the like. The first terminal can be a terminal associated with any one of a plurality of intercom apparatuses communicating with each other. There may be one or more first intercom apparatuses, that is, the first terminal may be associated with one first intercom apparatus or a plurality of first intercom apparatuses. The second terminal is a terminal associated with an intercom apparatus other than the intercom apparatuses associated with the first terminal in the plurality of intercom apparatuses communicating with each other. There may be one or more second terminals. Correspondingly, there may be one or more second intercom apparatuses. One second terminal can be associated with one second intercom apparatus or a plurality of second intercom apparatuses.

Figure 1:
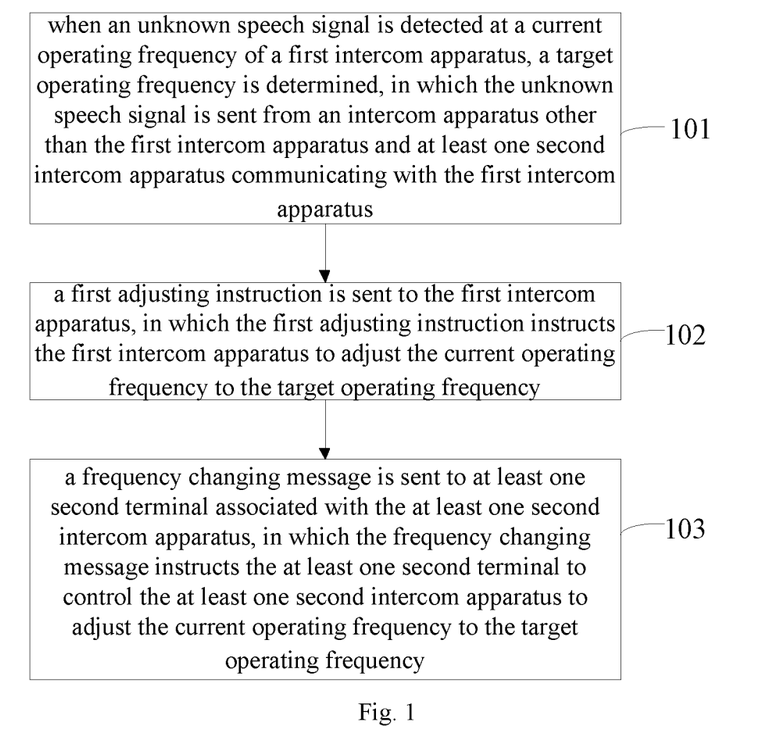
FIG. 1 is a flow chart showing a method for adjusting frequencies of intercom apparatuses, according to an exemplary embodiment.

FIG. 1 is a flow chart of a method for adjusting frequencies of intercom apparatuses, according to an exemplary embodiment. Referring to FIG. 1, the method is applied to a first terminal, and includes the following actions.

In block 101, when an unknown speech signal is detected at a current operating frequency of a first intercom apparatus, a target operating frequency is determined. The unknown speech signal is sent from an intercom apparatus other than the first intercom apparatus and at least one second intercom apparatus communicating with the first intercom apparatus.

In block 102, a first adjusting instruction is sent to the first intercom apparatus. The first adjusting instruction instructs the first intercom apparatus to adjust the current operating frequency to the target operating frequency.

In block 103, a frequency changing message is sent to at least one second terminal associated with the at least one second intercom apparatus. The frequency changing message instructs the at least one second terminal to control the at least one second intercom apparatus to adjust the current operating frequency to the target operating frequency.

In embodiments of the present disclosure, the first terminal can automatically detect whether there is an unknown speech signal at the current operating frequency of the first intercom apparatus. When the unknown speech signal is detected at the current operating frequency of the first intercom apparatus, the first terminal sends the first adjusting instruction to the first intercom apparatus to instruct the first intercom apparatus to adjust the current operating frequency to the target operating frequency, and sends the frequency changing message to the at least one second terminal associated with the at least one second intercom apparatus to instruct the at least one second terminal to control the at least one second intercom apparatus to adjust the current operating frequency to the target operating frequency, thus realizing automatically adjusting the frequencies of the intercom apparatuses without user's operation, and improving efficiency for adjusting frequencies of the intercom apparatuses.

In a possible implementation of embodiments of the present disclosure, determining a target operating frequency includes: sending a frequency changing request to a server, and receiving the target operating frequency in an idle state returned by the server; or, receiving a frequency input by a user, and determining the frequency input by the user as the target operating frequency.

In a possible implementation of embodiments of the present disclosure, the method further includes: receiving an apparatus identification sent from the first intercom apparatus, in which the apparatus identification is of a sending apparatus from which a speech signal is sent and received by the first intercom apparatus; if apparatus identifications of the at least one second intercom apparatus does not contain the apparatus identification sent from the first intercom apparatus, determining that there is the unknown speech signal at the current operating frequency of the first intercom apparatus.

In a possible implementation of embodiments of the present disclosure, the method further includes: receiving a speech signal sent from the first intercom apparatus, in which the speech signal is a speech signal received by the first intercom apparatus; if the speech signal sent from the first intercom apparatus does not match with a reserved speech signal of the at least one second intercom apparatus, determining that there is the unknown speech signal at the current operating frequency of the first intercom apparatus.

In a possible implementation of embodiments of the present disclosure, sending a first adjusting instruction to the first intercom apparatus includes: displaying a frequency changing button in a current display interface; and when it is detected that the frequency changing button is triggered, sending the first adjusting instruction to the first intercom apparatus.

All the above described possible technical solutions may be combined to form alternative embodiments of the present disclosure, which will not be described in detail.

Figure 2:
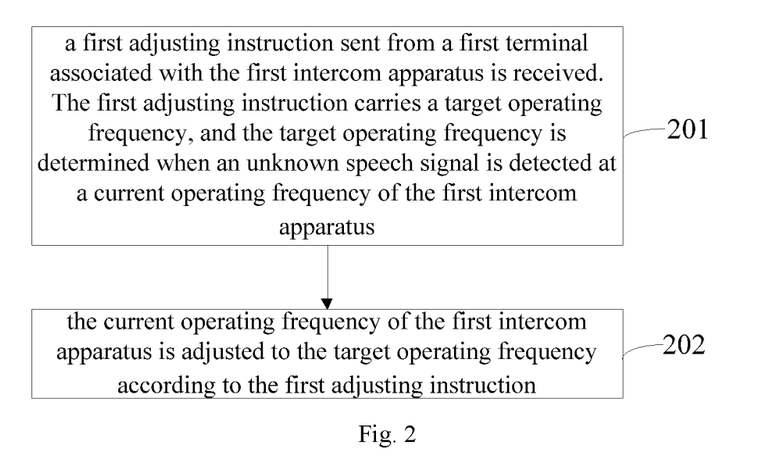
FIG. 2 is a flow chart showing a method for adjusting frequencies of intercom apparatuses, according to an exemplary embodiment.

FIG. 2 is a flow chart of a method for adjusting frequencies of intercom apparatuses, according to an exemplary embodiment. Referring to FIG. 2, the method is applied to a first intercom apparatus, and includes the following actions.

In block 201, a first adjusting instruction sent from a first terminal associated with the first intercom apparatus is received. The first adjusting instruction carries a target operating frequency, and the target operating frequency is determined when an unknown speech signal is detected at a current operating frequency of the first intercom apparatus.

In block 202, the current operating frequency of the first intercom apparatus is adjusted to the target operating frequency according to the first adjusting instruction.

In embodiments of the present disclosure, the first intercom apparatus can automatically adjust the current operating frequency thereof to the target operating frequency according to the first adjusting instruction sent from the first terminal, thus saving user's time for manually adjusting the frequency, and improving efficiency for adjusting the frequency of intercom apparatus.

In a possible implementation of embodiments of the present disclosure, the method further includes: sending a third adjusting instruction to at least one second intercom apparatus, in which the third adjusting instruction instructs the at least one second intercom apparatus to adjust current operating frequency to the target operating frequency, and the at least one second intercom apparatus communicates with the first intercom apparatus.

All the above described possible technical solutions may be combined to form alternative embodiments of the present disclosure, which will not be described in detail here.

Figure 3:
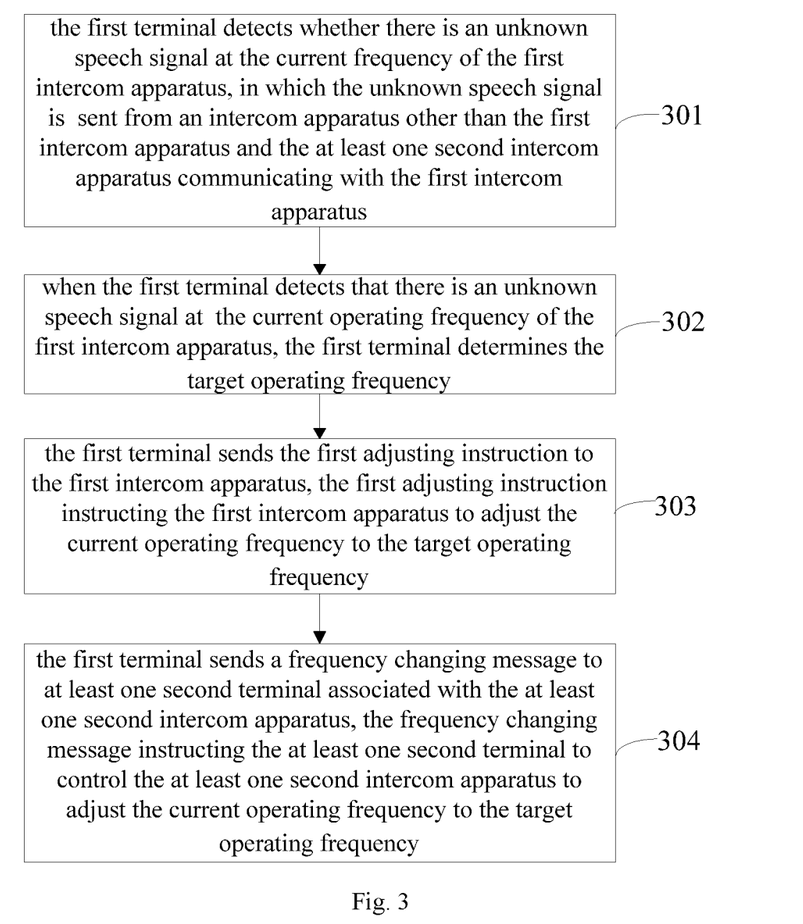
FIG. 3 is a flow chart showing a method for adjusting frequencies of intercom apparatuses, according to an exemplary embodiment.

FIG. 3 is a flow chart of a method for adjusting frequencies of intercom apparatuses, according to an exemplary embodiment. Referring to FIG. 3, the method is applied to a first terminal, and includes the following actions.

In block 301, the first terminal detects whether there is an unknown speech signal at the current operating frequency of the first intercom apparatus. The unknown speech signal is sent from an intercom apparatus other than the first intercom apparatus and the at least one second intercom apparatus communicating with the first intercom apparatus.

In this block, the first terminal is associated with the first intercom apparatus. The at least one second terminal is associated with the at least one second intercom apparatus respectively. Before the first intercom apparatus communicates with the at least one second intercom apparatus, the first terminal obtains a specified operating frequency, and sends a fourth adjusting instruction to the first intercom apparatus. The fourth adjusting instruction instructs the first intercom apparatus to adjust the current operating frequency to the specified operating frequency. The first intercom apparatus receives the fourth adjusting instruction sent from the first terminal, and adjusts the current operating frequency to the specified operating frequency according to the fourth adjusting instruction.

In order to realize communication between the first intercom apparatus and the at least one second intercom apparatus, the first terminal sends the specified operating frequency to the at least one second terminal. The at least one second terminal receives the specified operating frequency, and sends a fifth adjusting instruction to the at least one second intercom apparatus associated therewith according to the specified operating frequency. The fifth adjusting instruction is configured to instruct the at least one intercom apparatus to adjust the current operating frequency to the specified operating frequency. The at least one intercom apparatus receives the fifth adjusting instruction sent from the at least one second terminal, and adjusts the current operating frequency to the specified operating frequency according to the fifth adjusting instruction.

The first terminal can communicate with the at least one second terminal through Bluetooth, Wi-Fi, or the like, and the first terminal may send the specified operating frequency to the at least one second terminal as follows.

The first terminal sends the specified operating frequency to the at least one second terminal through a Bluetooth channel between the first terminal and the at least one second terminal, or through a Wi-Fi channel between the first terminal and the at least one second terminal.

After the first intercom apparatus and the at least one second intercom apparatus adjust their current operating frequency to the specified operating frequency, the first intercom apparatus and the at least one second intercom apparatus can receive and send signals at the specified operating frequency, that is, the first intercom apparatus (or the at least one second intercom apparatus) can send a speech signal, and can receive a speech signal sent from the at least one second intercom apparatus (or the first intercom apparatus). However, when a third intercom apparatus other than the first intercom apparatus and the at least one second intercom apparatus also adjusts its current operating frequency to the specified operating frequency, the third intercom apparatus can also receive and send signals at the specified operating frequency. A speech signal sent from the third intercom apparatus is called as the unknown speech signal for ease of describing. In this case, the unknown speech signal may interfere with the communication between the first intercom apparatus and the at least one second intercom apparatus, and the third intercom apparatus may eavesdrop on speech signals between the first intercom apparatus and the at least one second intercom apparatus. Therefore, in a communication process between the first intercom apparatus and the at least one second intercom apparatus, the first terminal needs to detect whether there is an unknown speech signal at the current operating frequency of the first intercom apparatus in real time.

In the method provided in embodiments of the present disclosure, in order to avoid interference of the unknown speech signal with the communication between the first intercom apparatus and the at least one second intercom apparatus, the first terminal can detect whether there is an unknown speech signal at the current operating frequency of the first intercom apparatus through following three implementations.

In a first possible implementation of embodiments of the present disclosure, the first terminal stores an apparatus identification of each of the at least one second intercom apparatus, and determines whether there is the an unknown speech signal at the current operating frequency of the first intercom apparatus according to an apparatus identification of a sending apparatus from which the speech signal is sent and received by the first intercom apparatus. Therefore, for the first implementation, block 301 may be implemented by actions 3011a and 3012a below.

In block 3011a, the first terminal receives an apparatus identification sent from the first intercom apparatus. The apparatus identification is of a sending apparatus sending a speech signal received by the first intercom apparatus.

A speech signal sent by each intercom apparatus carries an apparatus identification of the corresponding intercom apparatus. Therefore, when the first intercom apparatus receives a speech signal, the first intercom apparatus obtains an apparatus identification of the sending apparatus which sends the speech signal, and sends the apparatus identification to the first terminal. The first terminal receives the apparatus identification sent from the first intercom apparatus.

In block 3012a, if apparatus identifications of the at least one second intercom apparatus do not contain the apparatus identification sent from the first intercom apparatus, it is determined that there is the unknown speech signal at the current operating frequency of the first intercom apparatus.

Before the first intercom apparatus communicates with the at least one second intercom apparatus, the first terminal stores an apparatus identification of each of the at least one second intercom apparatus. In this block, the first terminal determines whether the apparatus identifications of the at least one second intercom apparatus contain the apparatus identification sent from the first intercom apparatus. If the apparatus identifications of the at least one second intercom apparatus do not contain the apparatus identification sent from the first intercom apparatus, the first terminal determines that the speech signal received by the first intercom apparatus is not sent from at least one second intercom apparatus, i.e., the speech signal received by the first intercom apparatus is an unknown speech signal that is, the first terminal determines that there is an unknown speech signal at the current operating frequency of the first intercom apparatus. If the apparatus identifications of the at least one second intercom apparatus contain the apparatus identification sent from the first intercom apparatus, the first terminal determines that the speech signal received by the first intercom apparatus is sent from the at least one second intercom apparatus, that is, the first terminal determines that there is no unknown speech signal at the current operating frequency of the first intercom apparatus.

The apparatus identification can be a serial number of an apparatus, a nickname of a user using the apparatus, or the like, which is not limited in embodiments of the present disclosure.

In a second possible implementation of embodiments of the present disclosure, before the first intercom apparatus communicates with the at least one second intercom apparatus, the first terminal stores a reserved speech signal of the at least one second intercom apparatus, and a process for the first terminal to obtain the reserved speech signal of the at least one second intercom apparatus may be as follows.

When the first intercom apparatus communicates with the at least one second intercom apparatus for a first time, the first terminal sends the specified operating frequency to the at least one second terminal. The at least one second terminal receives the specified operating frequency sent from the first terminal, and sends the reserved speech signal of the at least one second intercom apparatus to the first terminal. The first terminal receives the reserved speech signal of the at least one second intercom apparatus sent from the at least one second terminal.

In the second implementation of embodiments of the present disclosure, the first terminal can detect whether there is an unknown speech signal at the current operating frequency of the first intercom apparatus according the reserved speech signal. Therefore, for the second implementation, block 301 may be implemented by actions 3011b and 3012b below.

In block 3011b, the first terminal receives a speech signal sent from the first intercom apparatus. The speech signal is a speech signal received by the first intercom apparatus.

In this block, the first intercom apparatus receives a speech signal sent from an intercom apparatus other than the first intercom apparatus, and sends the speech signal to the first terminal. The first terminal receives the speech signal sent from the first intercom apparatus.

In block 3012b, if the speech signal sent from the first intercom apparatus does not match with the reserved speech signal of the at least one second intercom apparatus, the first terminal determines that there is the unknown speech signal at the current operating frequency of the first intercom apparatus.

The first terminal calculates a sound wave matching degree between the reserved speech signal and the speech signal sent from the first intercom apparatus. If the sound wave matching degree is not greater than a preset threshold, the first terminal determines that the speech signal is not sent from the at least one second intercom apparatus and is an unknown speech signal, that is, the first terminal determines that there is the unknown speech signal at the current operating frequency of the first intercom apparatus. If the sound wave matching degree is greater than a preset threshold, the first terminal determines that the speech signal is sent from the at least one second intercom apparatus, that is, the first terminal determines that there is no unknown speech signal at the current operating frequency of the first intercom apparatus.

In a third possible implementation of embodiments of the present disclosure, the first intercom apparatus detects whether there is an unknown speech signal at the current operating frequency of the first intercom apparatus, and sends a detection result to the first terminal. Thus, for the third implementation, block 301 may be implemented as follows.

A first frequency changing request sent by the first intercom apparatus is received. The first frequency changing request is sent when the first intercom apparatus detects that there is an unknown speech signal at the current operating frequency. It is determined that there is an unknown speech signal at the current operating frequency of the first intercom apparatus according the first frequency changing request.

When the first terminal detects that there is an unknown speech signal at the current operating frequency of the first intercom apparatus, it needs to adjust the current operating frequency of the first intercom apparatus and the at least one second intercom apparatus to another operating frequency, and action 302 will be executed to determine the target operating frequency.

In block 302, when the first terminal detects that there is an unknown speech signal at the current operating frequency of the first intercom apparatus, the first terminal determines the target operating frequency.

When there is an unknown speech signal at the current operating frequency of the first intercom apparatus, it needs to adjust the current operating frequency of the first intercom apparatus and the at least one second intercom apparatus to another operating frequency, so as to avoid interference generated by the unknown speech signal on the communication between the first intercom apparatus and the at least one second intercom apparatus. Therefore, the first terminal needs to determine the target operating frequency firstly. The first terminal can determine the target operating frequency through following two implementations.

In a first possible implementation of embodiments of the present disclosure, the target operating frequency is determined by a server. Therefore, for the first implementation, block 302 may include followings.

The first terminal sends a second frequency changing request to the server, and receives the target operating frequency in an idle state returned by the server.

In a possible implementation of embodiments of the present disclosure, the target operating frequency is directly determined by a server. In other words, the server receives the second frequency changing request sent from the first terminal, selects an operating frequency in an idle state from a plurality of operating frequencies of intercom apparatus and determines it as the target operating frequency, and sends the target operating frequency to the first terminal.

In another possible implementation of embodiments of the present disclosure, the first terminal sends a plurality of candidate operating frequencies to the server and the sever selects a target operating frequency in an idle state from the plurality of candidate operating frequencies, a process of which may be as follows.

The first terminal obtains a plurality of candidate operating frequencies set by the user, and sends the second frequency changing request to the server. The second frequency changing request may carry the plurality of candidate operating frequencies. The server receives the second frequency changing request sent from the first terminal, obtains the plurality of candidate operating frequencies from the second frequency changing request, and selects a candidate operating frequency in an idle state from the plurality of candidate operating frequencies as the target operating frequency according an operating state of each of the plurality of candidate operating frequencies.

In a possible implementation of embodiments of the present disclosure, when the server determines that there are a plurality of operating frequencies in the idle state, the server can select an operating frequency with a highest priority from the plurality of operating frequencies in the idle state according to a priority of each of the plurality of operating frequencies in the idle state, or, the server can select an operating frequency with a best communication quality from the plurality of operating frequencies in the idle state according to the communication quality of each of the plurality of operating frequencies in the idle state. Then, the server determines the selected operating frequency as the target operating frequency.

In a second possible implementation of embodiments of the present disclosure, the target operating frequency can be input by the user. Therefore, for the second implementation, block 302 may be as follows.

The first terminal receives an operating frequency input by the user, and determines the operating frequency input by the user as the target operating frequency.

When the first terminal detects that there is an unknown speech signal at the current operating frequency of the first intercom apparatus, the first terminal displays an input box on a current display interface. The user can input or select an operating frequency in the interface. The first terminal receives the operating frequency input in the input box or selected by the user, and determines the operating frequency input or selected by the user as the target operating frequency.

Figure 4:
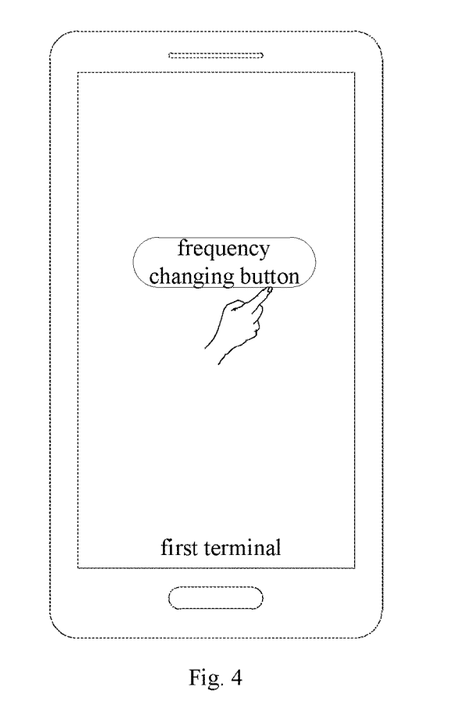
FIG. 4 is a schematic diagram illustrating a current display interface of a first terminal, according to an exemplary embodiment.

After the first terminal determines the target operating frequency, as shown in FIG. 4, the first terminal can send a first adjusting instruction to the first intercom apparatus. The first intercom apparatus adjusts the current operating frequency to the target operating frequency according to the first adjusting instruction. The first terminal can send a frequency changing message to the at least one second terminal. The at least one second terminal controls the at least one second intercom apparatus to adjust the current operating frequency to the target operating frequency according the frequency changing message. Therefore, this can be realized through actions 303 and 304 as following.

In block 303, the first terminal sends the first adjusting instruction to the first intercom apparatus. The first adjusting instruction instructs the first intercom apparatus to adjust the current operating frequency to the target operating frequency.

After the first terminal determines the target operating frequency, it obtains an apparatus identification of the first intercom apparatus associated with the first terminal, and sends the first adjusting instruction to the first intercom apparatus according the apparatus identification of the first intercom apparatus. The first adjusting instruction carries the target operating frequency. The first intercom apparatus receives the first adjusting instruction sent from the first terminal, obtains the target operating frequency from the first adjusting instruction, and adjusts the current operating frequency to the target operating frequency.

In a possible implementation of embodiments of the present disclosure, in order to improve accuracy of the intercom apparatuses to adjust the frequencies, to avoid that the first intercom apparatus fails to adjust the frequency, and to ensure that the first intercom apparatus and the at least one second intercom apparatus are adjusted to a same operating frequency, the first intercom apparatus sends a first response message to the first terminal after the first intercom apparatus adjusts the current operating frequency to the target operating frequency, in which the first response message carries a current operating frequency of the first intercom apparatus after frequency adjusting. The first terminal receives the first response message sent from the first intercom apparatus, and determines whether the current operating frequency carried by the first response message is same as the target operating frequency, if yes, determines that the current operating frequency of the first intercom apparatus is the target operating frequency, and if no, determines that the current operating frequency of the first intercom apparatus is not the target operating frequency, and informs a first user to manually adjust the current operating frequency of the first intercom apparatus to the target operating frequency.

In block 304, the first terminal sends a frequency changing message to at least one second terminal associated with the at least one second intercom apparatus. The frequency changing message instructs the at least one second terminal to control the at least one second intercom apparatus to adjust the current operating frequency to the target operating frequency.

The first terminal sends the frequency changing message to the at least one second terminal associated with the at least one second intercom apparatus. The frequency changing message carries the target operating frequency. The at least one second terminal receives the frequency changing message sent from the first terminal, and sends a second adjusting instruction to the at least one second intercom apparatus according to the frequency changing message. The second adjusting instruction carries the target operating frequency. The at least one second intercom apparatus receives the second adjusting instruction sent from the at least one second terminal, obtains the target operating frequency from the second adjusting instruction, and adjusts the current operating frequency of the at least one second intercom apparatus to the target operating frequency according to the target operating frequency.

Figure 5:
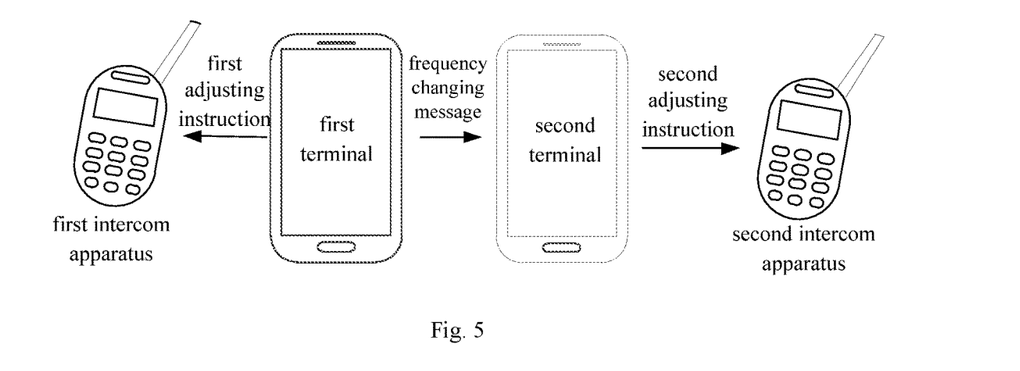
FIG. 5 is a schematic diagram illustrating an implementation environment of a method for adjusting frequencies of intercom apparatuses, according to an exemplary embodiment.

In a possible implementation of embodiments of the present disclosure, the second terminal can also display a frequency changing button in the current display interface. As shown in FIG. 5, a second user can click the frequency changing button to trigger the second terminal to send the second adjusting instruction to the second intercom apparatus. Thus, the second terminal may send the second adjusting instruction to the second intercom apparatus as follows.

The frequency changing button is displayed in the current display interface of the at least one second terminal. When it is detected that the frequency changing button is triggered, the second adjusting instruction is sent to the at least one second intercom apparatus.

In a possible implementation of embodiments of the present disclosure, in order to improve accuracy of the intercom apparatuses to adjust the frequency, to avoid that the at least one second intercom apparatus fails to adjust the frequency, and to ensure that the first intercom apparatus and the at least one second intercom apparatus are at a same operating frequency, the at least one second intercom apparatus sends a second response message to the at least one second terminal after adjusting the current operating frequency to the target operating frequency, in which the second response message carries a current operating frequency of the at least one second intercom apparatus after frequency adjusting. The at least one second terminal receives the second response message sent from the at least one second intercom apparatus, determines whether the current operating frequency carried by the second response message is same as the target operating frequency carried by the frequency changing message sent from the first terminal, if yes, determines that the current operating frequency of the at least one second intercom apparatus is the target operating frequency, and if no, determines that the current operating frequency of the at least one second intercom apparatus is not the target operating frequency, and informs the second user to manually adjust the current operating frequency of the at least one second intercom apparatus to the target operating frequency.

For example, when the first intercom apparatus and the at least one second intercom apparatus are communicating with each other at an operating frequency of 400.8 MHz, and when the first terminal detects that there is an unknown speech signal sent from an intercom apparatus other than the first intercom apparatus and the at least one second intercom apparatus communicating with the first intercom apparatus at the operating frequency of 400.8 MHz, the first terminal determines the target operating frequency as 402.1 MHz, and then adjusts the current operating frequency of the first intercom apparatus and the current operating frequency of the at least one second intercom apparatus to the operating frequency of 402.1 MHz.

In embodiments of the present disclosure, the first terminal can automatically detect whether there is an unknown speech signal at the current operating frequency of the first intercom apparatus. When the unknown speech signal is detected at the current operating frequency of the first intercom apparatus, the first terminal sends the first adjusting instruction to the first intercom apparatus to instruct the first intercom apparatus to adjust the current operating frequency to the target operating frequency, and sends the frequency changing message to the at least one second terminal associated with the at least one second intercom apparatus to instruct the at least one second terminal to control the at least one second intercom apparatus to adjust the current operating frequency to the target operating frequency, in which the target operating frequency is an operating frequency in an idle state, such that it avoids that the interference of the unknown speech signal can still be detected after the first intercom apparatus is adjusted to the target operating frequency, thus realizing automatically adjusting the frequencies of the intercom apparatuses, and improving efficiency and accuracy for adjusting the frequencies of the intercom apparatuses.

The target operating frequency can also be input by the user, such that the first intercom apparatus and the at least one second intercom apparatus can communicate with each other at the target operating frequency specified by the user. In addition, the first terminal can display the frequency changing button in the current display interface. When the user wants to change the frequency, the user can click the frequency changing button, thus improving controllability for adjusting the frequencies of intercom apparatuses, and enhancing user viscosity.

All the above described possible technical solutions may be combined to form alternative embodiments of the present disclosure, which will not be described in detail.

Figure 6:
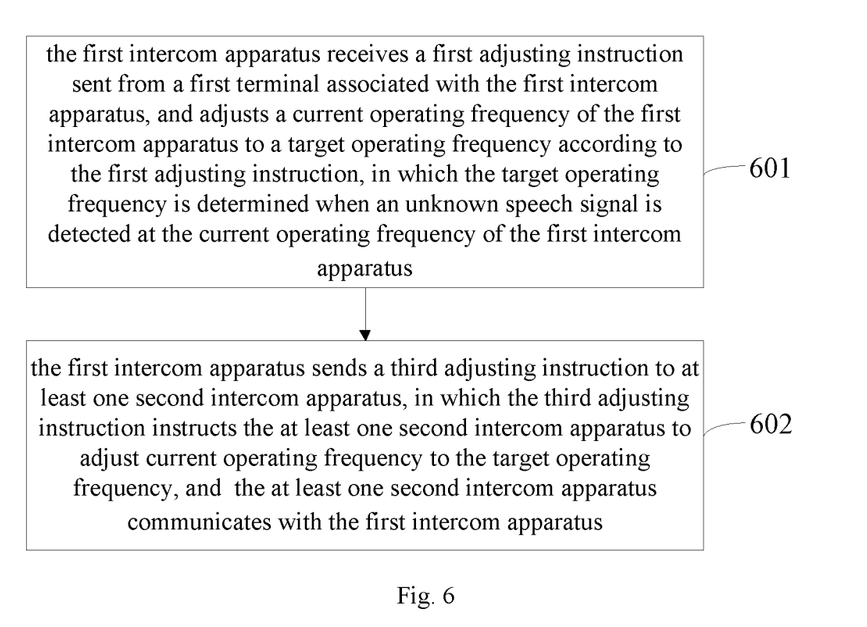
FIG. 6 is a flow chart showing a method for adjusting frequencies of intercom apparatuses, according to an exemplary embodiment.

FIG. 6 is a flow chart showing a method for adjusting frequencies of intercom apparatuses, according to an exemplary embodiment. As shown in FIG. 6, the method for adjusting frequencies of intercom apparatuses is applied to a first intercom apparatus, and includes following actions.

In block 601, the first intercom apparatus receives a first adjusting instruction sent from a first terminal associated with the first intercom apparatus, and adjusts a current operating frequency of the first intercom apparatus to a target operating frequency according to the first adjusting instruction. The target operating frequency is determined when an unknown speech signal is detected at the current operating frequency of the first intercom apparatus.

Before the first intercom apparatus receives the first adjusting instruction sent from the first terminal associated with the first intercom apparatus, the first terminal detects whether there is an unknown speech signal at the current operating frequency of the first intercom apparatus. When the first terminal detects that there is an unknown speech signal at the current operating frequency of the first intercom apparatus, the first terminal determines the target operating frequency, and the first terminal sends the first adjusting instruction to the first intercom apparatus. In another embodiment of the present disclosure, above actions have been described in detail, i.e., implementations of actions executed before the first intercom apparatus receives the first adjusting instruction sent from the first terminal associated with the first intercom apparatus are the same as that of actions 301 to 303, which is not elaborated here.

The first intercom apparatus receives the first adjusting instruction sent from the first terminal associated with the first intercom apparatus. The first adjusting instruction carries the target operating frequency. The first intercom apparatus obtains the target operating frequency from the first adjusting instruction, and adjusts the current operating frequency of the first intercom apparatus to the target operating frequency.

In a possible implementation of embodiments of the present disclosure, in order to improve accuracy of the intercom apparatuses' adjusting the frequency, to avoid that the first intercom apparatus fails to adjust the frequency, and to ensure that the first intercom apparatus and the at least one second intercom apparatus are adjusted to a same operating frequency, the first intercom apparatus sends a first response message to the first terminal after adjusting the current operating frequency to the target operating frequency, in which the first response message carries a current operating frequency of the first intercom apparatus after frequency adjusting. The first terminal receives the first response message sent from the first intercom apparatus, and determines whether the current operating frequency carried by the first response message is same as the target operating frequency, if yes, determines that the current operating frequency of the first intercom apparatus is the target operating frequency, and if no, determines that the current operating frequency of the first intercom apparatus is not the target operating frequency, and informs a first user of the first intercom apparatus to manually adjust the current operating frequency of the first intercom apparatus to the target operating frequency.

In block 602, the first intercom apparatus sends a third adjusting instruction to at least one second intercom apparatus. The third adjusting instruction instructs the at least one second intercom apparatus to adjust current operating frequency to the target operating frequency. The at least one second intercom apparatus are intercom apparatuses communicating with the first intercom apparatus.

Before the first intercom apparatus and the at least one second intercom apparatus communicate with each other, the first intercom apparatus can store an apparatus identification of each of the at least one second intercom apparatus in advance. Therefore, the action that the first intercom apparatus sends the third adjusting instruction to the at least one second intercom apparatus may be as follows.

The first intercom apparatus generates the third adjusting instruction according the target operating frequency. The third adjusting instruction carries the target operating frequency. The first intercom apparatus sends the third adjusting instruction to the at least one second intercom apparatus. The at least one second intercom apparatus receives the third adjusting instruction sent from the first intercom apparatus, obtains the target operating frequency from the third adjusting instruction, and adjusts the current operating frequency of the at least one second intercom apparatus to the target operating frequency.

In a possible implementation of embodiments of the present disclosure, in order to improve accuracy of the intercom apparatuses' adjusting the frequency, to avoid that the first intercom apparatus fails to adjust the frequency, and to ensure that the first intercom apparatus and the at least one second intercom apparatus are adjusted to a same operating frequency, the at least one second intercom apparatus sends a third response message to the first intercom apparatus after adjusting the current operating frequency to the target operating frequency, in which the third response message carries a current operating frequency of the at least one second intercom apparatus after frequency adjusting. The first intercom apparatus receives the third response message sent from the at least one second intercom apparatus, determines whether the current operating frequency carried by the third response message is same as the target operating frequency, if yes, determines that the current operating frequency of the at least one second intercom apparatus is the target operating frequency, and if no, determines that the current operating frequency of the at least one second intercom apparatus is not the target operating frequency, and informs the second user to manually adjust the current operating frequency of the at least one second intercom apparatus to the target operating frequency.

In embodiments of the present disclosure, the first intercom apparatus can automatically adjust the current operating frequency thereof to the target operating frequency according to the first adjusting instruction sent from the first terminal, thus saving user's time for manually adjusting the frequency. In addition, the first intercom apparatus can directly send the third adjusting instruction to the at least one second intercom apparatus according to the target operating frequency, such that the at least one second intercom apparatus adjusts current operating frequency thereof to the target operating frequency according to the third adjusting instruction, realizing that the first intercom apparatus controls the at least one second intercom apparatus to adjust the frequency without the need of sending the frequency changing message to the at least one second terminal by the first terminal and controlling the at least one second intercom apparatus by the at least one second terminal to adjust the frequency, thus improving efficiency for adjusting the frequencies of intercom apparatuses.

All the above described possible technical solutions may be combined to form alternative embodiments of the present disclosure, which will not be elaborated here.

Figure 7:
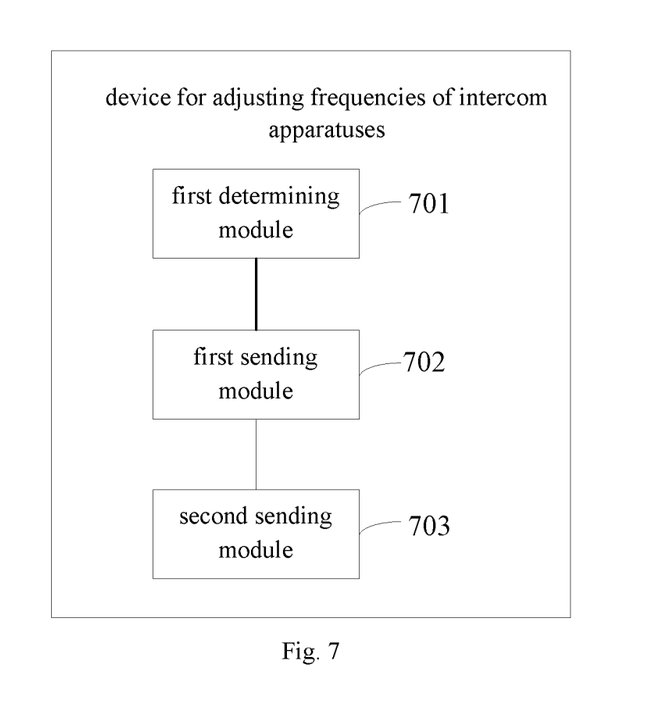
FIG. 7 is a block diagram of a device for adjusting frequencies of intercom apparatuses, according to an exemplary embodiment.

FIG. 7 is a block diagram of a device for adjusting frequencies of intercom apparatuses, according to an exemplary embodiment. As shown in FIG. 7, the device includes a first determining module 701, a first sending module 702 and a second sending module 703.

The first determining module 701 is configured to determine a target operating frequency, when an unknown speech signal is detected at a current operating frequency of a first intercom apparatus. The unknown speech signal is sent from an intercom apparatus other than the first intercom apparatus and at least one second intercom apparatus communicating with the first intercom apparatus.

The first sending module 702 is configured to send a first adjusting instruction to the first intercom apparatus. The first adjusting instruction instructs the first intercom apparatus to adjust the current operating frequency to the target operating frequency.

The second sending module 703 is configured to send a frequency changing message to at least one second terminal associated with the at least one second intercom apparatus. The frequency changing message instructs the at least one second terminal to control the at least one second intercom apparatus to adjust the current operating frequency to the target operating frequency.

In a possible implementation of embodiments of the present disclosure, the first determining module 701 is configured to send a frequency changing request to a server, and to receive the target operating frequency in an idle state returned by the server. Alternatively, the first determining module 701 is configured to receive a frequency input by a user, and to determine the frequency input by the user as the target operating frequency.

In a possible implementation of embodiments of the present disclosure, the device further includes a first receiving module and a second determining module.

The first receiving module is configured to receive an apparatus identification sent from the first intercom apparatus. The apparatus identification is an apparatus identification of a sending apparatus from which a speech signal is sent and received by the first intercom apparatus.

The second determining module is configured to determine that there is the unknown speech signal at the current operating frequency of the first intercom apparatus if apparatus identifications of the at least one second intercom apparatus do not contain the apparatus identification sent from the first intercom apparatus.

In a possible implementation of embodiments of the present disclosure, the device further includes a second receiving module and a third determining module.

The second receiving module is configured to receive a speech signal sent from the first intercom apparatus. The speech signal is a speech signal received by the first intercom apparatus.

The third determining module is configured to determine that there is the unknown speech signal at the current operating frequency of the first intercom apparatus if the speech signal sent from the first intercom apparatus does not match with a reserved speech signal of the at least one second intercom apparatus.

In a possible implementation of embodiments of the present disclosure, the first sending module 702 includes a displaying unit and a sending unit.

The displaying unit is configured to display a frequency changing button in a current display interface.

The sending unit is configured to send the first adjusting instruction to the first intercom apparatus when it is detected that the frequency changing button is triggered.

In embodiments of the present disclosure, the first terminal can automatically detect whether there is an unknown speech signal at the current operating frequency of the first intercom apparatus. When the unknown speech signal is detected at the current operating frequency of the first intercom apparatus, the first terminal sends the first adjusting instruction to the first intercom apparatus to instruct the first intercom apparatus to adjust the current operating frequency to the target operating frequency, and sends the frequency changing message to the at least one second terminal associated with the at least one second intercom apparatus to instruct the at least one second terminal to control the at least one second intercom apparatus to adjust the current operating frequency to the target operating frequency, in which the target operating frequency is an operating frequency in an idle state, such that it avoids that the interference of the unknown speech signal can still be detected after the first intercom apparatus is adjusted to the target operating frequency, thus realizing automatically adjusting the frequencies of the intercom apparatuses, and improving efficiency and accuracy for adjusting the frequencies of the intercom apparatuses.

The target operating frequency can also be input by the user, such that the first intercom apparatus and the at least one second intercom apparatus can communicate with each other at the target operating frequency specified by the user. In addition, the first terminal can display the frequency changing button in the current display interface. When the user wants to change the frequency, the user can click the frequency changing button, thus improving controllability for adjusting the frequency of intercom apparatuses, and enhancing user viscosity.

All the above described possible technical solutions may be combined to form alternative embodiments of the present disclosure, which will not be described in detail.

Figure 8:
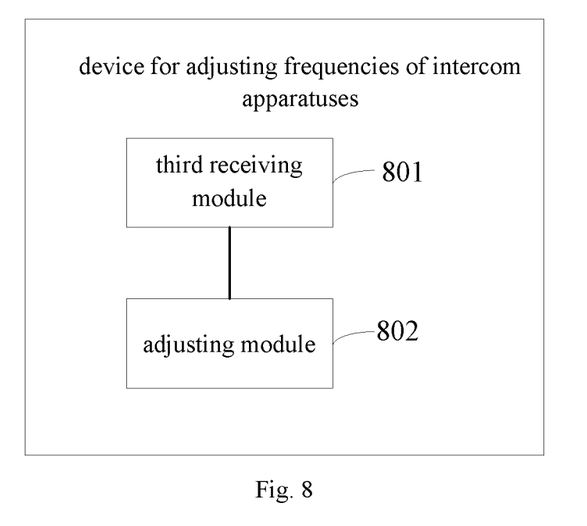
FIG. 8 is a block diagram of a device for adjusting frequencies of intercom apparatuses, according to an exemplary embodiment.

FIG. 8 is a block diagram of a device for adjusting frequencies of intercom apparatuses, according to an exemplary embodiment. As shown in FIG. 8, the device includes a third receiving module 801 and an adjusting module 802.

The third receiving module 801 is configured to receive a first adjusting instruction sent from a first terminal associated with the first intercom apparatus. The first adjusting instruction carries a target operating frequency. The target operating frequency is determined when an unknown speech signal is detected at a current operating frequency of the first intercom apparatus.

The adjusting module 802 is configured to adjust the current operating frequency of the first intercom apparatus to the target operating frequency according to the first adjusting instruction.

In a possible implementation of embodiments of the present disclosure, the device further includes a third sending module.

The third sending module is configured to send a third adjusting instruction to at least one second intercom apparatus, in which the third adjusting instruction instructs the at least one second intercom apparatus to adjust current operating frequency to the target operating frequency, and the at least one second intercom apparatus are intercom apparatuses communicating with the first intercom apparatus.

In embodiments of the present disclosure, the first intercom apparatus can automatically adjust the current operating frequency thereof to the target operating frequency according to the first adjusting instruction sent from the first terminal, thus saving user's time for manually adjusting the frequency. In addition, the first intercom apparatus can directly send the third adjusting instruction to the at least one second intercom apparatus according to the target operating frequency, and the at least one second intercom apparatus adjusts current operating frequency thereof to the target operating frequency according to the third adjusting instruction, realizing that the first intercom apparatus controls the at least one second intercom apparatus to adjust the frequency without the need of sending the frequency changing message to the at least one second terminal by the first terminal and controlling the at least one second intercom apparatus by the at least one second terminal to adjust the frequency, thus improving efficiency for adjusting the frequencies of intercom apparatuses.

All the above described possible technical solutions may be combined to form alternative embodiments of the present disclosure, which will not be described in detail.

It should be noted that, the device for adjusting frequencies of intercom apparatuses provided in above embodiments is exemplified by the division of the functional modules when adjusting the frequency of the intercom apparatuses. In practical use, the above functions can be assigned by different functional modules as needed, that is, external structure of the device is divided into different functional modules to realize all or part of the functions described above. In addition, the device for adjusting frequencies of intercom apparatuses provided in above embodiments belongs to a same concept with that of embodiments of the method for adjusting frequencies of intercom apparatuses, specific implementation process of which can refer to embodiments of the method and will not be elaborated herein.

Figure 9:
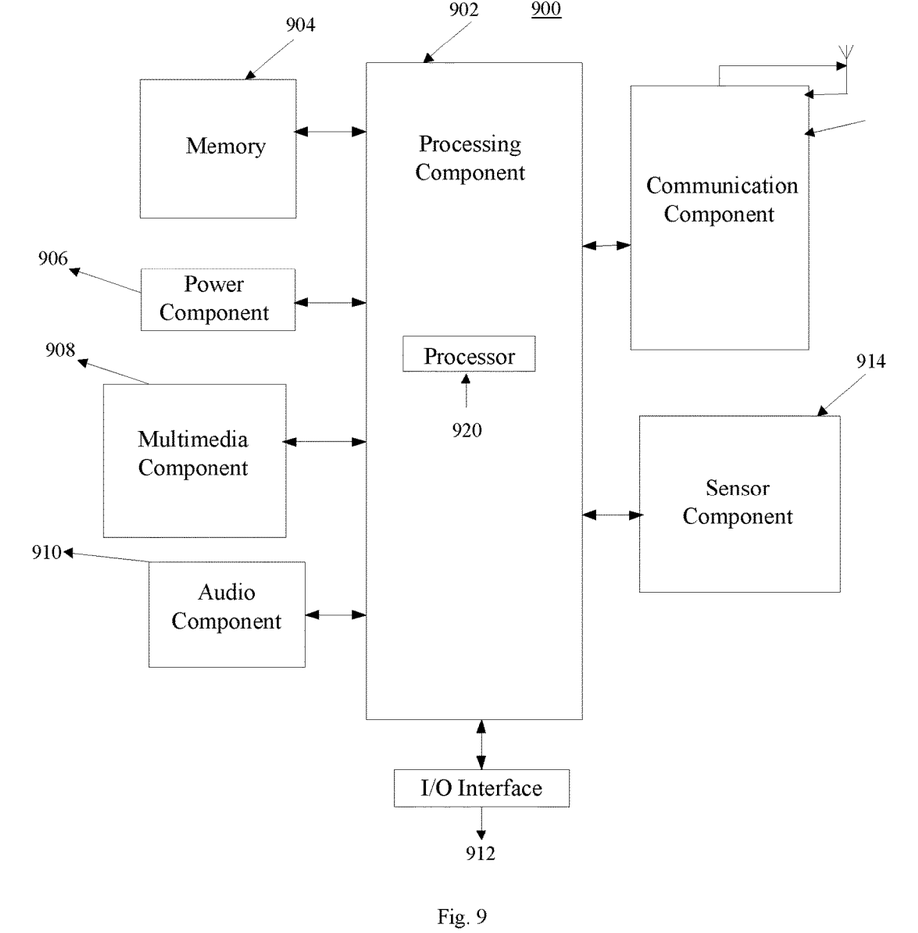
FIG. 9 is a block diagram of a device for adjusting frequencies of intercom apparatuses, according to an exemplary embodiment.

FIG. 9 is a block diagram of a device 900 for adjusting a frequency of intercom apparatuses, according to an exemplary embodiment. For example, the device 900 may be a mobile phone, a computer, a digital broadcast terminal, a messaging device, a gaming console, a tablet, a medical device, exercise equipment, a personal digital assistant, and the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi, 2G or 3G or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium, having stored therein instructions that, when executed by a processor of the first terminal or a processor of the first intercom apparatus, cause the first terminal or the first intercom apparatus to perform the above method for adjusting frequencies of intercom apparatuses.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for adjusting frequencies of intercom apparatuses, the method applied to a first terminal and comprising:
   receiving an apparatus identification sent from a first intercom apparatus, wherein the apparatus identification is indicative of a sending apparatus, a speech signal being sent from the sending apparatus and received by the first intercom apparatus, the first intercom apparatus communicating directly with at least one second intercom apparatus associated with at least one second terminal without through the first and second terminals;
   if apparatus identifications of the at least one second intercom apparatus do not contain the apparatus identification sent from the first intercom apparatus, determining that there is an unknown speech signal at a current operating frequency of the first intercom apparatus;
   determining a target operating frequency; and
   sending a first adjusting instruction instructing the first intercom apparatus to adjust the current operating frequency to the target operating frequency; and
   sending a frequency changing message to the at least one second terminal for controlling the at least one second intercom apparatus to adjust the current operating frequency to the target operating frequency, such that the first intercom apparatus communicates, at the target operating frequency, directly with the at least second intercom apparatus without through the first and second terminals.

2. The method according to claim 1, wherein determining a target operating frequency comprises:
   sending a frequency changing request to a server; and
   receiving the target operating frequency in an idle state returned by the server.

3. The method according to claim 1, wherein determining a target operating frequency comprises:
   receiving a frequency input by a user; and
   determining the frequency input by the user as the target operating frequency.

4. The method according to claim 1, further comprising:
   receiving a speech signal sent from the first intercom apparatus, wherein the speech signal is received by the first intercom apparatus from an apparatus other than the first intercom apparatus;
   if the speech signal sent from the first intercom apparatus has a sound wave that does not match with a sound wave of a reserved speech signal of the at least one second intercom apparatus, determining that there is the unknown speech signal at the current operating frequency of the first intercom apparatus.

5. The method according to claim 1, wherein sending a first adjusting instruction instructing the first intercom apparatus to adjust the current operating frequency to the target operating frequency comprises:
   displaying a frequency changing button in a current display interface; and
   when it is detected that the frequency changing button is triggered, sending the first adjusting instruction to the first intercom apparatus.

6. A method for adjusting frequencies of intercom apparatuses, the method applied to a first intercom apparatus and comprising:
   sending an apparatus identification to a first terminal, wherein the apparatus identification is indicative of a sending apparatus, a speech signal being sent from the sending apparatus and received by the first intercom apparatus, the first intercom apparatus communicating directly with at least one second intercom apparatus associated with at least one second terminal without through the first and second terminals;
   if apparatus identifications of the at least one second intercom apparatus do not contain the apparatus identification sent from the first intercom apparatus, determining that there is an unknown speech signal at a current operating frequency of the first intercom apparatus;
   receiving an adjusting instruction sent from a first terminal associated with the first intercom apparatus, wherein the first adjusting instruction carries a target operating frequency, and the target operating frequency is determined when the unknown speech signal is detected at the current operating frequency of the first intercom apparatus;
   adjusting the current operating frequency of the first intercom apparatus to the target operating frequency according to the first adjusting instruction; and
   sending another adjusting instruction instructing at least one second intercom apparatus to adjust the current operating frequency to the target operating frequency.

7. A device for adjusting frequencies of intercom apparatuses, the device comprising:
   a processor; and
   a memory configured to store instructions executable by the processor;
   wherein the processor is configured to:
   receive an apparatus identification sent from a first intercom apparatus, wherein the apparatus identification is indicative of a sending apparatus, a speech signal being sent from the sending apparatus and received by the first intercom apparatus, the first intercom apparatus communicating directly with at least one second intercom apparatus associated with at least one second terminal without through the first and second terminals;
   if apparatus identifications of the at least one second intercom apparatus do not contain the apparatus identification sent from the first intercom apparatus, determine that there is an unknown speech signal at a current operating frequency of the first intercom apparatus;
   determine a target operating frequency;
   send a first adjusting instruction instructing the first intercom apparatus to adjust the current operating frequency to the target operating frequency; and
   send a frequency changing message to the at least one second terminal for controlling the at least one second intercom apparatus to adjust the current operating frequency to the target operating frequency, such that the first intercom apparatus communicates, at the target operating frequency, directly with the at least second intercom apparatus without through the first and second terminals.

8. The device according to claim 7, wherein the processor configured to determine the target operating frequency is further configured to:
   send a frequency changing request to a server; and
   receive the target operating frequency in an idle state returned by the server.

9. The device according to claim 7, wherein the processor configured to determine the target operating frequency is further configured to:

receive a frequency input by a user; and determine the frequency input by the user as the target operating frequency.

10. The device according to claim 7, wherein the processor is further configured to:

receive a speech signal sent from the first intercom apparatus, wherein the speech signal is received by the first intercom apparatus from an apparatus other than the first intercom apparatus;

if the speech signal sent from the first intercom apparatus has a sound wave that does not match with a sound wave of a reserved speech signal of the at least one second intercom apparatus, determine that there is the unknown speech signal at the current operating frequency of the first intercom apparatus.

11. The device according to claim 7, wherein the processor configured to send the first adjusting instruction instructing the first intercom apparatus to adjust the current operating frequency to the target operating frequency is further configured to:

display a frequency changing button in a current display interface; and when it is detected that the frequency changing button is triggered, send the first adjusting instruction to the first intercom apparatus.

\* \* \* \* \*